United States Patent
Liverato et al.

(10) Patent No.: US 12,092,163 B2
(45) Date of Patent: Sep. 17, 2024

(54) METHOD FOR MOUNTING A SENSOR BEARING UNIT, AND SENSOR BEARING UNIT ADAPTED TO SUCH A METHOD

(71) Applicant: Aktiebolaget SKF, Gothenburg (SE)

(72) Inventors: Yves-André Liverato, Saint Paterne Racan (FR); Eric Robert, Saint Cyr sur Loire (FR); Vincent Sausset, Azay-le-Rideau (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/503,582

(22) Filed: Oct. 18, 2021

(65) Prior Publication Data

US 2022/0034366 A1 Feb. 3, 2022

Related U.S. Application Data

(63) Continuation of application No. 17/007,621, filed on Aug. 31, 2020, now Pat. No. 11,187,272.

(30) Foreign Application Priority Data

Sep. 11, 2019 (DE) .......................... 102019213805.5

(51) Int. Cl.
*F16C 41/00* (2006.01)
*F16C 33/58* (2006.01)
(Continued)

(52) U.S. Cl.
CPC .......... *F16C 41/007* (2013.01); *F16C 33/586* (2013.01); *F16C 43/04* (2013.01);
(Continued)

(58) Field of Classification Search
CPC ...... F16C 33/586; F16C 41/007; F16C 43/04; F16C 2233/00; F16C 19/06; G01D 5/24442; G01P 3/443; G01B 5/252
See application file for complete search history.

(56) References Cited

U.S. PATENT DOCUMENTS

| 5,333,480 A | 8/1994 | Berstein |
| 5,359,784 A | 11/1994 | Tomida et al. |

(Continued)

FOREIGN PATENT DOCUMENTS

| CN | 108071674 A | 5/2018 |
| DE | 19528872 A1 | 2/1997 |

(Continued)

OTHER PUBLICATIONS

Machine Translation of JP-2010127296-A (Year: 2010).*

(Continued)

*Primary Examiner* — Alan B Waits
(74) *Attorney, Agent, or Firm* — GARCIA-ZAMOR INTELLECTUAL PROPERTY LAW, LLC; Ruy Garcia-Zamor

(57) ABSTRACT

A method for mounting a sensor bearing unit providing a bearing and an impulse ring provided with a target holder and with a target mounted on an axial portion of the target holder. The method including measuring an eccentricity $E_1$ between the target and the axial portion of the target holder, measuring an eccentricity $E_2$ between a groove made in the bore of an inner ring of the bearing and the bore, introducing the target holder inside the groove, turning the target holder inside the groove to an angular position in which the eccentricity $E_{total}$ between the target and the bore of the inner ring is less than or equal to a predetermined value which is lower than the sum of the eccentricities $E_1$ and $E_2$, and securing the target holder inside the groove of the inner ring at the angular position.

12 Claims, 2 Drawing Sheets

(51) Int. Cl.
*F16C 43/04* (2006.01)
*G01B 5/252* (2006.01)
*G01D 5/244* (2006.01)
*G01P 3/44* (2006.01)
*F16C 19/06* (2006.01)

(52) U.S. Cl.
CPC ......... *G01B 5/252* (2013.01); *G01D 5/24442* (2013.01); *G01P 3/443* (2013.01); *F16C 19/06* (2013.01)

(56) References Cited

U.S. PATENT DOCUMENTS

| | | | |
|---|---|---|---|
| 5,774,074 A | | 6/1998 | Cooper et al. |
| 9,494,196 B2* | | 11/2016 | Sausset .................. G01P 3/443 |
| 10,324,103 B2* | | 6/2019 | Simonin ............... F16C 33/581 |
| 2001/0000713 A1* | | 5/2001 | Nakamura .......... F16C 33/7876 324/207.25 |
| 2002/0134927 A1 | | 9/2002 | Kudo |
| 2002/0180425 A1 | | 12/2002 | Morimura |
| 2011/0006758 A1 | | 1/2011 | Mitterreiter |
| 2015/0204385 A1* | | 7/2015 | Sausset .................. G01P 3/443 384/448 |
| 2018/0024157 A1 | | 1/2018 | Simonin et al. |
| 2018/0128320 A1* | | 5/2018 | Chaussat .................. G01D 5/12 |

FOREIGN PATENT DOCUMENTS

| | | | | |
|---|---|---|---|---|
| EP | 2583836 A1 | | 4/2013 | |
| IT | TO20030868 A1 | | 5/2005 | |
| JP | H0543073 U | | 2/1993 | |
| JP | 2000162222 A | | 6/2000 | |
| JP | 2001004648 A | | 1/2001 | |
| JP | 2002206557 A | | 7/2002 | |
| JP | 2004037356 A | | 2/2004 | |
| JP | 2006342860 A | | 12/2006 | |
| JP | 2007100789 A | | 4/2007 | |
| JP | 2007198992 A | | 8/2007 | |
| JP | 2010014130 A | | 1/2010 | |
| JP | 2010038250 A | | 2/2010 | |
| JP | 2010127296 A | * | 6/2010 | ............ F16C 33/782 |
| JP | 2015163818 A | | 9/2015 | |
| JP | 2018096469 A | | 6/2018 | |
| JP | 2019032032 A | | 2/2019 | |
| WO | 2014006436 A1 | | 1/2014 | |

OTHER PUBLICATIONS

Research on the Axial Magnetic Force of Axially Magnetized Bi-ring Permanent Magnetic Bearing.
Influence of Dimension Error of Cage Pocket of Cylindrical Roller Bearing on Motion Accuracy.
Design of Railway Freight Car Axle-Bearing Detection System Based on Linear Array CCD Sensor.

* cited by examiner

METHOD FOR MOUNTING A SENSOR BEARING UNIT, AND SENSOR BEARING UNIT ADAPTED TO SUCH A METHOD

CROSS-REFERENCE TO RELATED APPLICATIONS

This application claims priority to and benefit of U.S. patent application Ser. No. 17/007,621, filed Aug. 31, 2020, which claims priority to German Patent Application no. 102019213805.5, filed Sep. 1, 2019; each of the above identified applications is hereby incorporated herein by reference as if fully set forth in its entirety.

TECHNICAL FIELD OF THE INVENTION

The present invention relates to a method for mounting a sensor bearing unit. More precisely, the present invention relates to a method for mounting a sensor bearing unit comprising a bearing and an impulse ring.

BACKGROUND OF THE INVENTION

Today, sensor bearing units are commonly used in a wide range of technical fields, for example in automotive industry and aeronautics.

These units provide high quality signals and transmissions, while allowing integration in simpler and more compact apparatus.

Such a sensor bearing unit generally comprises a bearing, an impulse ring, and detection means facing the impulse ring. The impulse ring is provided with a target holder fixed to the inner ring of the bearing and with a magnetized target fixed to the target holder beyond the outer ring of the bearing.

The magnetized target includes alternating North and South poles, whose number depends on bearing size, detection precision and particular application. The detection means may be fixed to the outer ring of the bearing or to a fixed casing.

The magnetized target is attached to an outer tubular portion of the target holder. The target holder is also provided with an inner tubular portion secured into a groove made in the bore of the inner ring.

With such a sensor bearing unit, the axis centres of the magnetized target and inner ring are not concentric. This impacts the measurement accuracy of the sensor bearing unit.

One aim of the present invention is to overcome this drawback.

SUMMARY OF THE INVENTION

One aspect of the invention relates to a method for mounting a sensor bearing unit comprising a bearing having an inner ring and an outer ring centered on an axis, and an impulse ring provided with a target holder secured into a groove made in a cylindrical surface of the inner or outer ring, and with a target mounted on an axial portion of the target holder extending parallel to the axis.

In one embodiment, the method comprises the following steps:
measuring an eccentricity $E_1$ between the target and the axial portion of the target holder of the impulse ring,
measuring an eccentricity $E_2$ between the groove and the cylindrical surface of the inner or outer ring,
introducing the target holder of the impulse ring inside the groove of the inner or outer ring,
turning the target holder of the impulse ring inside the groove of the inner or outer ring to an angular position in which the eccentricity $E_{total}$ between the target of the impulse ring and the cylindrical surface of the inner or outer ring is less than or equal to a predetermined value which is lower than the sum of the eccentricities $E_1$ and $E_2$, and
securing the target holder of the impulse ring inside the groove of the inner or outer ring at the angular position.

With such method, the measurement accuracy of the sensor bearing unit is improved with no higher costs since the spacing between the center of the target and the center of the cylindrical surface of the inner or outer ring is minimized.

According to further aspect, the step d) of the method may comprise the following sub-steps:
d1) turning the target holder of the impulse ring inside the groove (16e) of the inner or outer ring to a first angular position,
d2) measuring the eccentricity $E_{total}$ at the first angular position,
d3) determining if the eccentricity $E_{total}$ is less than the predetermined value,
d4a) if such is the case, securing the target holder of the impulse ring inside the groove of the inner or outer ring at the first angular position,
d4b) if such is not the case, resuming the sub-steps d1) to d3) for another angular position(s) of the target holder inside the groove of the inner or outer ring until the eccentricity $E_{total}$ at the another angular position is less than the predetermined value.

Preferably, at step d) the target holder of the impulse ring is turned relative to the inner or outer ring to an angular position in which the eccentricity $E_{total}$ is equal to the absolute value of the difference between the eccentricities $E_1$ and $E_2$.

Accordingly, the spacing between the center of the target and the center of the cylindrical surface of the inner or outer ring ring is kept to a minimum.

In one embodiment, at step d) the target holder of the impulse ring may be turned relative to the inner or outer ring by introducing a tool inside at least one axial through-hole made into the thickness of the target holder.

In one embodiment, at step e) the target holder of the impulse ring may be secured inside the groove of the inner or outer ring by press-fitting.

In one embodiment, the groove is made in the bore of the inner ring forming the cylindrical surface. Accordingly, the target holder is secured to the inner ring. In this case, the target may be mounted on an outer axial portion of the target holder which radially surrounds the outer ring of the bearing.

In another embodiment, the groove is provided on the outer ring. Accordingly, the target holder is secured to the outer ring. In this case, the groove may be made in the outer cylindrical surface of the outer ring.

The invention also relates to a sensor bearing unit mounted according to the above-mentioned method.

The invention further relates to a sensor bearing unit comprising:
a bearing comprising an inner ring and an outer ring centered on an axis, and
an impulse ring provided with a target holder secured into a groove made in a cylindrical surface of the inner or outer ring, and with a target mounted on an axial portion of the target holder extending parallel to the axis. ring of the bearing.

According to a general feature, at least one through-hole is made in the thickness of the target holder.

The through-hole may be made in the thickness of a radial portion of the target holder.

In one embodiment, the groove is made in the bore of the inner ring forming the cylindrical surface. Alternatively, the groove may be provided on the outer ring.

BRIEF DESCRIPTION OF THE DRAWINGS

The present invention and its advantages will be better understood by studying the detailed description of a specific embodiment given by way of a non-limiting example and illustrated by the appended drawings on which.

DETAILED DESCRIPTION OF SOME EMBODIMENTS

Figure 1:
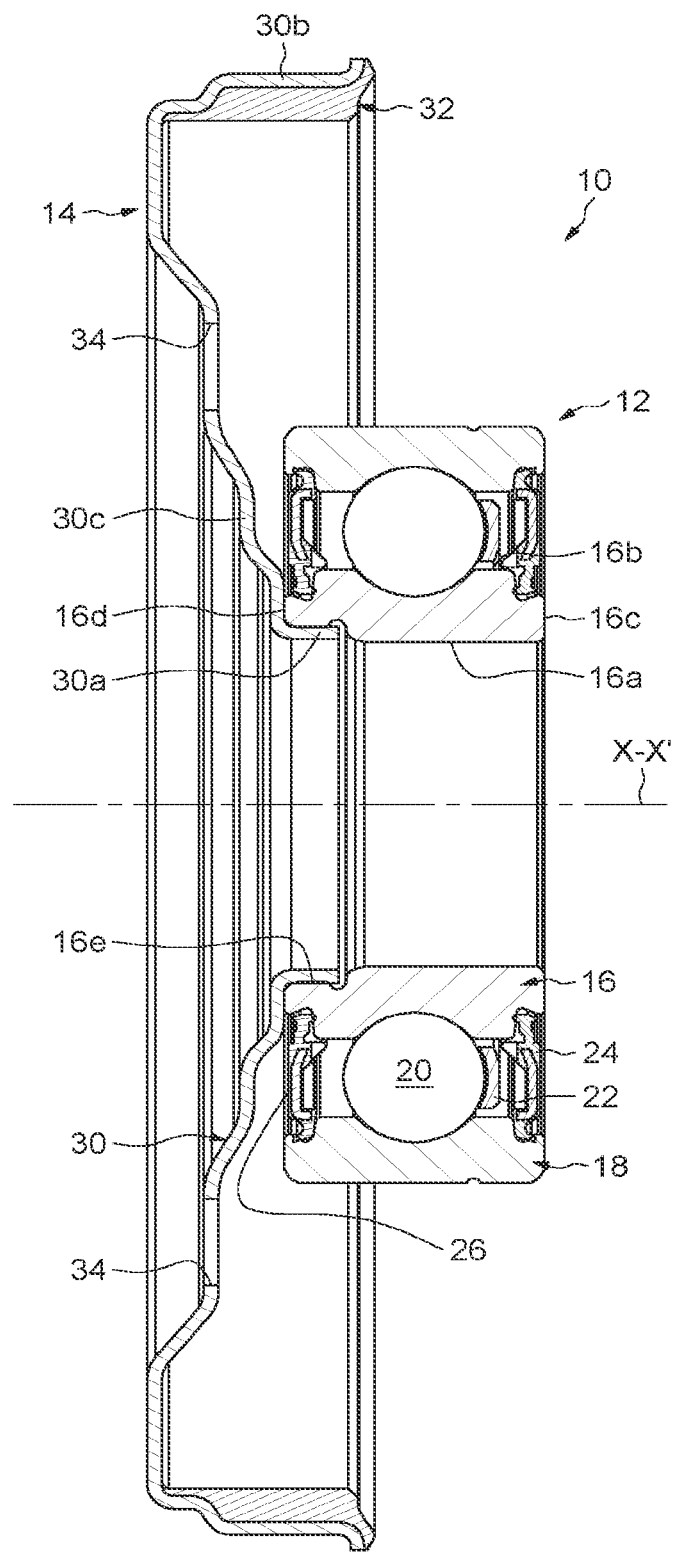
FIG. 1 is an axial section view of a sensor bearing unit according to an example of the invention.

The sensor bearing unit 10 represented on FIG. 1 is adapted to equip an apparatus such a motor, a brake system, a suspension system or any rotating machine, in particular for an automotive vehicle.

The sensor bearing unit 10 comprises a bearing 12 and an impulse ring 14 mounted on the bearing.

The bearing 12 comprises an inner ring 16 and an outer ring 18. The inner and outer rings 16, 18 are concentric and extend axially along the bearing rotation axis X-X' which runs in an axial direction.

The bearing 12 also comprises a row of rolling elements 20, which are provided here in the form of balls, interposed between the inner and outer rings 16, 18. The rolling bearing 10 also comprises a cage 22 for maintaining the regular circumferential spacing of the rolling elements 20. In the disclosed embodiment, the bearing 12 further comprises on each side an annular seal 24, 26 to close the radial space that exists between the inner and outer rings 16, 18.

The inner ring 16 of the bearing is intended to be mounted on a shaft of the apparatus for tracking the rotation of the shaft. The inner ring 16 is intended to rotate while the outer ring 18 is intended to be fixed. The outer ring 40 can be mounted in a fixed support member or housing, belonging to the apparatus.

The inner ring 16 comprises a cylindrical inner surface or bore 16a and an outer cylindrical surface 16b from which a toroidal circular raceway for the rolling elements 20 is formed, the raceway being directed radially outwards. The inner ring 16 further comprises two opposite radial lateral faces 16c, 16d which axially delimit the bore 16a and the outer surface 16b of the ring.

The inner ring 16 also comprises a cylindrical groove 16e made in its bore 16a. The groove 16e is centered on the axis X-X'. Diameter of bore 16a is smaller than diameter of groove 16e. The groove 16e opens on the radial lateral face 16d.

The impulse ring 14 is mounted on the inner ring 16. The impulse ring 14 comprises an annular target holder 30 mounted on the inner ring 16, and a target 32 mounted on the target holder.

The target holder 30 is secured into the annular groove 16e of the inner ring. The target holder 30 comprises an inner annular axial portion 30a mounted into the groove 16e of the inner ring, an outer annular axial portion 30b radially surrounding the inner axial portion 30a and the bearing 12, and an annular radial portion 30c extending between the inner and outer axial portions.

The inner axial portion 30a of the target holder is fitted into the groove 16e of the inner ring to fasten in rotation the impulse ring 30 with the rotatable inner ring 16. In the disclosed example, the radial portion 30c of the target holder axially comes into contact against the radial lateral face 16d of the inner ring. The outer axial portion 30b of the target holder is located radially above the outer ring 18 of bearing.

The target holder 30 further comprises through-holes 34 made axially in the thickness of the radial portion 30c. In the disclosed example, the target holder 30 comprises two through-holes 34 which are radially opposed with regard to the axis X-X'. Alternatively, the target holder 30 may comprise a different number of through-holes 34, for example one or at least three. In the disclosed example, the target holder 30 is made in one part. The target holder 30 may be made of metal or plastic, formed by stamping or by any other suitable process.

The target 32 is mounted on the outer axial portion 30b of the target holder. In the disclosed example, the target 32 is mounted into the bore of the outer axial portion 30b. Alternatively, the target 32 may be mounted on the outer surface of the outer axial portion 30b.

The target 32 is a plastic molded part including magnetic alternating North and South alternated poles. Detection means (not shown) are associated with the target 32 for tracking the rotation of the impulse ring 14 and the inner ring 16 around the axis X-X'. The detection means are disposed to radially face the inner surface of the target 32. For example, the detection means may include Hall-effect sensors.

Alternatively, detection means and impulse ring 14 may use any other suitable technology instead of magnetic technology. For example, induction technology or optic technology may be implemented within the bearing unit 10.

Figure 2:
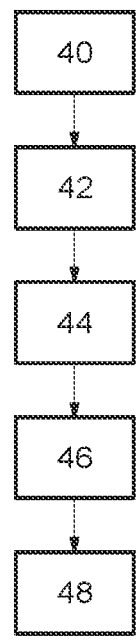
FIG. 2 shows the main steps of a method for mounting the sensor bearing unit of FIG. 1 according to an example of the invention.

FIG. 2 shows the main steps of a method for mounting the sensor bearing unit according to an example of the invention.

At a first step 40, one measures a first eccentricity $E_1$ between the target 32 and the outer axial portion 30b of the target holder. During this first step, the target holder 30 is not yet mounted on the bearing 12. The target holder 30 is in a free state.

To calculate the center $C_{32}$ of the target 32, the coordinates of an arbitrary point taken on the bore of the target 32 are first measured at at least three locations with the use of a measuring microscope or the like. On the basis of the measured coordinates, the coordinates of the center $C_{32}$ of the target 32 can be calculated.

Then, to calculate the center $C_{30b}$ of the outer axial portion 30b of the target holder, the coordinates of an arbitrary point taken on the outer surface of the outer axial portion 30b are measured at at least three locations. On the basis of the measured coordinates, the coordinates of the center $C_{30b}$ of the outer axial portion 30b of the target holder can be calculated.

The previously calculated coordinates of the center $C_{32}$ of the target 32 are then compared with the coordinates of the center $C_{30b}$ of the outer axial portion 30b of the target holder to obtain the eccentricity $E_1$. The eccentricity $E_1$ is the spacing between the center $C_{32}$ of the target 32 and the center $C_{30b}$ of the outer axial portion 30b of the target holder.

At a second step 42, one measures a second eccentricity $E_2$ between the groove 16e made in the bore of the inner ring and the bore 16a.

To calculate the center $C_{16e}$ of the groove 16e of the inner ring, the coordinates of an arbitrary point taken on the bore of the groove 16e are measured at at least three locations. On the basis of the measured coordinates, the coordinates of the center $C_{16a}$ of the groove 16e of the inner ring can be calculated.

Then, to calculate the center $C_{16a}$ of the bore 16a of the inner ring, the coordinates of an arbitrary point taken on the bore of the groove 16e are measured at at least three locations. On the basis of the measured coordinates, the coordinates of the center $C_{16a}$ of the bore 16a of the inner ring can be calculated.

The previously calculated coordinates of the center $C_{16e}$ of the groove 16e are then compared with the coordinates of the center $C_{16a}$ of the bore 16a of the inner ring to obtain the eccentricity $E_2$. The eccentricity $E_2$ is the spacing between the center $C_{16e}$ of the groove 16e and the center $C_{16a}$ of the bore 16a of the inner ring.

At a third step 44, one introduces the inner axial portion 30a of the target holder into the groove 16e of the inner ring.

At a fourth step 46, one turns the target holder 30 in the circumferential direction inside the groove 16e of the inner ring to an angular position in which the eccentricity $E_{total}$ between the target 32 and the bore 16a of the inner ring is less than or equal to a predetermined value which is lower than the sum of the eccentricities $E_1$ and $E_2$. The eccentricity $E_{total}$ is the spacing between the center $C_{32}$ of the target 32 and the center $C_{16a}$ of the bore 16a of the inner ring.

Figure 3:
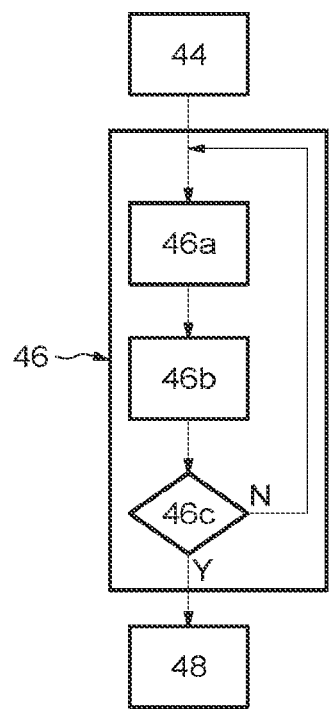
FIG. 3 shows one of the main steps of the mounting method according to an example of the invention.

More precisely, during step 46, one turns the target holder 30 relative to the inner ring 16 to a first angular position in a first sub-step 46a (FIG. 3). In order to turn the target holder 30 relative to the inner ring 16, a tool is firstly introduced into the through-holes 34 of the target holder and then the target holder is turned with the aid of the tool.

In a second sub-step 46b, at this first angular position, one measures the eccentricity $E_{total}$ between the target 32 and the bore 16a of the inner ring in the mounted state of the target holder 30 inside the groove 16e of the inner ring. To this end, similarly to step 40, the coordinates of the center $C_{32}$ of the target 32 is calculated in this mounted state. Then, similarly to step 42, the coordinates of the center $C_{16a}$ of the bore 16a of the inner ring is calculated. The calculated coordinates of the center $C_{32}$ of the target 32 are then compared with the coordinates of the center $C_{16a}$ of the bore 16a of the inner ring to obtain the eccentricity $E_{total}$ at this first angular position.

In a third sub-step 46c, one determines whether the eccentricity $E_{total}$ is less than or equal to the predetermined value.

If such is the case, one secures the target holder 30 inside the groove 16e of the inner ring at the first angular position in a fifth step 48. To this end, the inner axial portion 30a of the target holder may be press-fitted inside the groove 16e. Alternatively, the inner axial portion 30a of the target holder may be secured inside the groove 16e of the inner ring by any other appropriate means, for example by gluing or welding.

If such is not the case, the first, second and third sub-steps 46a to 46c of step 46 are repeated in a second angular position of the target holder 30 relative to the inner ring 16. The second angular position is distinct from the first angular position.

If the eccentricity $E_{total}$ at this second angular position is less than or equal to the predetermined value, the step 48 is performed. On the contrary, if the eccentricity $E_{total}$ at this second angular position is greater than the predetermined value, the first, second and third sub-steps 46a to 46c of step 46 are again repeated in a third angular position of the target holder 30 relative to the inner ring 16. The third angular position is distinct from the first and second angular positions. These first, second and third sub-steps 46a to 46c are repeated until the eccentricity $E_{total}$ at the new angular position is less than or equal to the predetermined value.

The predetermined value is chosen according to the maximum spacing desired between the center of the target 32 and the center of the bore 16a of the inner ring. Advantageously, the predetermined value may be equal to the absolute value of the difference between the eccentricities $E_1$ and $E_2$.

In the illustrated example, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

In the illustrated example, the sensor bearing unit is provided with a target holder secured to the inner ring. Alternatively, as previously mentioned, the target holder may be secured to the outer ring.

The invention claimed is:
1. A sensor bearing unit, comprising:
   an outer ring having a radially outermost axially extending surface;
   an inner ring, when viewed in cross section, having a bore therethrough formed, in part by a radially innermost axially extending inner ring surface, the inner ring and the outer ring being configured for relative rotation there between around a rotation axis, when viewed in cross section the inner ring having a lateral side;
   a plurality of rolling elements disposed between the outer ring and the inner ring; an impulse ring, comprising:
   a target; and
   a target holder, when viewed in cross section, having a radially innermost axial target holder portion which directly touches the lateral side of the inner ring and having an outer annular axial portion which is radially spaced from the radially outermost axially extending surface of the outer ring, the target holder having an intermediate target holder portion extending between the radially innermost axial target holder portion and the outer annular axial portion, the target being positioned on the target holder with a portion of the target overlapping both the outer annular axial portion of the target holder and the radially outermost axially extending surface of the outer ring, wherein the target is located radially inside the outer annular axial portion of the target holder and radially outside the outermost axially extending surface of the outer ring;
   wherein the intermediate target holder portion comprises:
      a first radially extending portion in contact with an axial end of the inner ring,
      a first angled portion extending axially and radially away from the first radially extending portion,
      a second radially extending portion extending from the first angled portion, a second angled portion extending axially and radially away from the second radially extending portion, a third radially extending portion extending from the second angled portion, a third angled portion extending axially and radially away from the third radially extending portion, and a fourth radially extending portion extending from the first angled portion, the first, second, third, and fourth radially extending portions being increasingly axially further from the bearing, respectively, and wherein the inner ring, when viewed in cross section, further defines a cylindrical groove which extends radially outwardly from the radially innermost axially extending surface of the inner ring, the cylindrical groove having a greater diameter than a portion of the bore formed by the radially extending innermost axially extending surface, the cylindrical groove being configured for mounting the radially innermost axial target holding portion thereby fastening the impulse ring to the inner ring, and wherein at least one through-hold is provided in the third radially extending portion.

2. The sensor bearing unit of claim 1, wherein the target is mounted on an inner cylindrical surface of a radially outermost axial target holder portion.

3. The sensor bearing unit of claim 2, further comprising a sensor for measuring the impulse of the target, the sensor facing a radial inner surface of the target and being located radially between the target and the outer ring, wherein the target and the sensor provide measurements via electromagnetic induction or electro-optics.

4. The sensor bearing unit of claim 1, wherein the target holder is made solely of metal.

5. The sensor bearing unit of claim 1, wherein the target holder is made solely of plastic.

6. The sensor bearing unit of claim 1, wherein the inner ring is configured to be mounted on a rotating shaft such that the radially innermost axially extending surface of the inner ring is positioned between the inner ring and the shaft.

7. A sensor bearing unit, comprising:

an outer ring having a radially outermost axially extending surface, when viewed in cross section, the outer ring having an outer ring lateral side;

an inner ring, when viewed in cross section, having a bore therethrough formed, in part by a radially innermost axially extending inner ring surface, the inner ring and the outer ring being configured for relative rotation there between around a rotation axis, when viewed in cross-section the inner ring having an inner ring lateral side, the inner ring lateral side and the outer ring lateral side being axially aligned;

a plurality of rolling elements disposed between the outer ring and the inner ring; an impulse ring, comprising:

a target; and a target holder, when viewed in cross section, having a radially innermost axial target holder portion which directly touches the inner ring lateral side of the inner ring and having an outer annular axial portion which is radially spaced from the radially outermost axially extending surface of the outer ring, the target being positioned on the target holder with a portion of the target overlapping both the outer annular axial portion of the target holder and the radially outermost axially extending surface of the outer ring, wherein the target is located radially inside the outer annular axial portion of the target holder and radially outside the outermost axially extending surface of the outer ring; and wherein the intermediate target holder portion comprises:

the first radially extending portion in contact with the axial end of the inner ring, the first angled portion extending axially and radially away from the first radially extending portion, the second radially extending portion extending from the first angled portion, the second angled portion extending axially and radially away from the second radially extending portion, the third radially extending portion extending from the second angled portion, the third angled portion extending axially and radially away from the third radially extending portion, and the fourth radially extending portion extending from the first angled portion, the first, second, third, and fourth radially extending portions being increasingly axially further from the bearing, respectively, and wherein the inner ring, when viewed in cross section, further defines a cylindrical groove which extends radially outwardly from the radially innermost axially extending surface of the inner ring, the cylindrical groove having a greater diameter than a portion of the bore formed by the radially extending innermost axially extending surface, the cylindrical groove being configured for mounting the radially innermost axial target holding portion thereby fastening the impulse ring to the inner ring, and wherein at least one through-hole is provided in the third radially extending portion.

8. The sensor bearing unit of claim 7, wherein the target is mounted on an inner cylindrical surface of a radially outermost axial target holder portion.

9. The sensor bearing unit of claim 8, further comprising a sensor for measuring the impulse of the target, the sensor facing a radial inner surface of the target and being located radially between the target and the outer ring, wherein the target and the sensor provide measurements via electromagnetic induction or electro-optics.

10. The sensor bearing unit of claim 7, wherein the target holder is made solely of metal.

11. The sensor bearing unit of claim 7, wherein the target holder is made solely of plastic.

12. The sensor bearing unit of claim 7, wherein the inner ring is configured to be mounted on a rotating shaft such that the radially innermost axially extending surface of the inner ring is positioned between the inner ring and the shaft.

\* \* \* \* \*